(12) United States Patent
Crown et al.

(10) Patent No.: US 10,708,435 B2
(45) Date of Patent: Jul. 7, 2020

(54) METHOD AND SYSTEM FOR SCHEDULING AND INITIATING A TELEPHONE CONFERENCE CALL OR OTHER EVENT

(71) Applicant: FracTel, LLC, Indialantic, FL (US)

(72) Inventors: Michael Crown, Indialantic, FL (US); Olaf Bellstedt, Malabar, FL (US); Chaitya Shah, Ahmedabad (IN)

(73) Assignee: FracTel, LLC

( * ) Notice: Subject to any disclaimer, the term of this patent is extended or adjusted under 35 U.S.C. 154(b) by 98 days.

(21) Appl. No.: 16/144,400

(22) Filed: Sep. 27, 2018

(65) Prior Publication Data

US 2019/0098139 A1 Mar. 28, 2019

Related U.S. Application Data

(60) Provisional application No. 62/563,665, filed on Sep. 27, 2017.

(51) Int. Cl.
*H04M 3/56* (2006.01)
*H04L 12/18* (2006.01)

(52) U.S. Cl.
CPC ........ *H04M 3/565* (2013.01); *H04L 12/1818* (2013.01); *H04L 12/1822* (2013.01); *H04M 2203/5063* (2013.01)

(58) Field of Classification Search
None
See application file for complete search history.

(56) References Cited

U.S. PATENT DOCUMENTS

| | | | |
|---|---|---|---|
| 2010/0121666 A1* | 5/2010 | Niazi | G06Q 10/0633 705/7.27 |
| 2011/0066743 A1* | 3/2011 | Hurley | H04W 4/021 709/231 |
| 2019/0266238 A1* | 8/2019 | Faulkner | H04L 12/1813 |
| 2019/0268385 A1* | 8/2019 | Faulkner | H04N 7/157 |

* cited by examiner

*Primary Examiner* — Harry S Hong
(74) *Attorney, Agent, or Firm* — Daniel C. Pierron; Widerman Malek PL

(57) ABSTRACT

A system for scheduling and initiating a telephone conference including an application server including: an interface and a parser operably coupled to the interface to extract information from received information. The system may further include a communication server that includes an event database operable to generate an event ID responsive to the received event information and store an event record, and a contact database comprising a plurality of contact records that determines if the plurality of contact records comprises either of the event host or the event participant. The system further includes a telephone interface operable to establish a conference call responsive to the event date and the event time and call each of the event host and the event participant.

20 Claims, 5 Drawing Sheets

200

Conference Information:

Subject: Conference Call
Organizer: John Doe
Start Time: Tue Sep 05 2017 12:00:00 GMT-0400 (Eastern Daylight Time)

218  Your Contact Details:

216 — Email:
Phone:
212 — First Name:
Last Name:
214 — Submit

METHOD AND SYSTEM FOR SCHEDULING AND INITIATING A TELEPHONE CONFERENCE CALL OR OTHER EVENT

RELATED APPLICATIONS

This application claims the benefit under 35 U.S.C. § 119(e) of U.S. Provisional Patent Application Ser. No. 62/563,665 titled Method and System for Scheduling and Initiating a Telephone Conference Call or Other Event filed on Sep. 27, 2017, the entire content(s) of which is/are incorporated herein by reference

FIELD OF THE INVENTION

The present invention relates to systems and methods for scheduling and initiating a conference call.

BACKGROUND OF THE INVENTION

Conference calls are an essential tool in telephonic communication to enable multiple participants to simultaneously converse without requiring cumbersome manual connection by a telephone user or operator. Traditionally, conference call participants have placed an outbound call to a telephone number associated with a conference call system, and in some instances enter a passcode or conference number to route to or be admitted to a particular conference call. However, it is a frequent occurrence for one or more intended participants for a conference call to not remember, miss a notification on their computer or smart device, or otherwise be tardy to enter a conference call, or miss the conference call entirely. This results in the other conference call participants either spending time waiting for the tardy call participant to join, performing an incomplete call without the benefit of the missing call participant, or rescheduling the conference call entirely, each outcome having significant attending cost in terms of lost productivity. Accordingly, there is a need in the art for a system operable to mitigate tardiness or absence for conference calls.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a system for scheduling and initiating a telephone conference comprising an application server comprising an interface operable to receive information related to a telephone conference, defining received information and a parser operably coupled to the interface and operable to extract information from the received information, defining event information, comprising an event date, an event time, an event title, an event host, an event participant, and an event location. The application server may be operable to transmit event information. The system may further comprise a communication server operable to receive event information from the application server, defining received event information, and comprising an event database operable to generate an event ID responsive to the received event information, store an event record comprising the received event information and the event ID, and transmit the event ID to the application server. The communication server may further comprise a contact database comprising a plurality of contact records and operable to determine if the plurality of contact records comprises either of the event host or the event participant, transmit an indication to the application server for each of the event host and the event participant comprised by the plurality of contact records, defining found contacts, update contact records associated with the found contacts with new or changed information comprised by the event information, generate a contact record comprising information for the unfound contacts, record the generated contact record to the contact database, and transmit an indication to the application server for each of the event host and the event participant not comprised by the plurality of contact records defining unfound contacts. The communication server may further comprise a telephone interface operable to establish a conference call responsive to the event date and the event time, initiate an outbound call to a first telephone number comprised by the contact record associated with the event host, initiate an outbound call to a first telephone number comprised by the contact record associated with the event participant, and place each of the event host or the event participant in the conference call upon the event host or the event participant answering the outbound call. Additionally, the application server may further be operable to transmit an indication about the event record to the found contacts and transmit a survey to the unfound contacts.

In some embodiments, the interface of the application server may be operable to receive a survey response comprising participant information, the parser may be operable to extract the participant information from the survey response; and transmit the participant information to the communication server, and the contact database may be operable to record the participant information to a contact record of the plurality of contact records associated with a person associated with the participant information.

In some embodiments, the telephone interface may be operable to delay initiating the outbound call to the event participant in the conference call until the event host is placed into the conference call.

In some embodiments, the found contacts may comprise the event participant, and the application server may be operable to transmit an indication to the event host that the event participant is comprised by the found contacts.

In some embodiments, the parser may be operable to extract contact information for each of the event host and the event participant; and wherein the survey is transmitted to a contact location comprised by contact information associated with the unfound contacts.

In some embodiments, the received information may comprise a recurring event. The event database may be operable to generate a plurality of event records and event IDs for each event associated with the recurring event.

In some embodiments, the contact record associated with either of the event host or the event participant may comprise a second telephone number. The telephone interface may be further operable to terminate the outbound call to the first telephone number comprised by the contact record associated with the event host or the event participant and initiate an outbound call to the second telephone number comprised by the contact record associated with the event host or the event participant.

In some embodiments, the application server may be further operable to receive a participation indication from the event participating as to whether the event participant will participate in the event associated with the event record and transmit an indication to the event host responsive to the participation indication.

In some embodiments, the application server may be further operable to receive an event change request; wherein the parser is operable to extract event change request information from the event change request, defining extracted change request information; wherein the application server is operable to transmit the extracted change request information; wherein the event database is operable to implement event changes comprised by the extracted change request information to an event record comprised by the event database.

In some embodiments, the interface may be operable to receive information related to a telephone conference via at least one of an e-mail calendar event and an application programming interface (API).

Additionally, embodiments of the invention may be directed to a method of scheduling and initiating a conference call using an application server comprising an interface and a parser and a communication server comprising an event database, a contact database, and a telephone interface, the method comprising receiving information related to a telephone conference, defining received information, parsing the receiving information to extract information from the received information, defining event information, comprising an event date, an event time, an event title, an event host, an event participant, and an event location, generating an event ID responsive to the received event information, storing an event record comprising the received event information and the event ID on the event database, determining if a plurality of contact records comprised by the contact database comprises either of the event host or the event participant, transmitting an indication to the application server for each of the event host and the event participant comprised by the plurality of contact records, defining found contacts, updating contact records associated with the found contacts with new or changed information comprised by the event information, transmitting an indication to the application server for each of the event host and the event participant not comprised by the plurality of contact records defining unfound contacts, transmitting an indication about the event record to the found contacts, generating a contact record comprising information for the unfound contacts, recording the generated contact record to the contact database, transmitting a survey to the unfound contacts, establishing a conference call responsive to the event date and the event time, initiating an outbound call to a first telephone number comprised by the contact record associated with the event host, initiating an outbound call to a first telephone number comprised by the contact record associated with the event participant, and placing each of the event host or the event participant in the conference call upon the event host or the event participant answering the outbound call.

BRIEF DESCRIPTION OF THE DRAWINGS

FIG. 2 is a survey according to an embodiment of the invention.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a system and method of scheduling and initiating a conference call.

Figure 1:
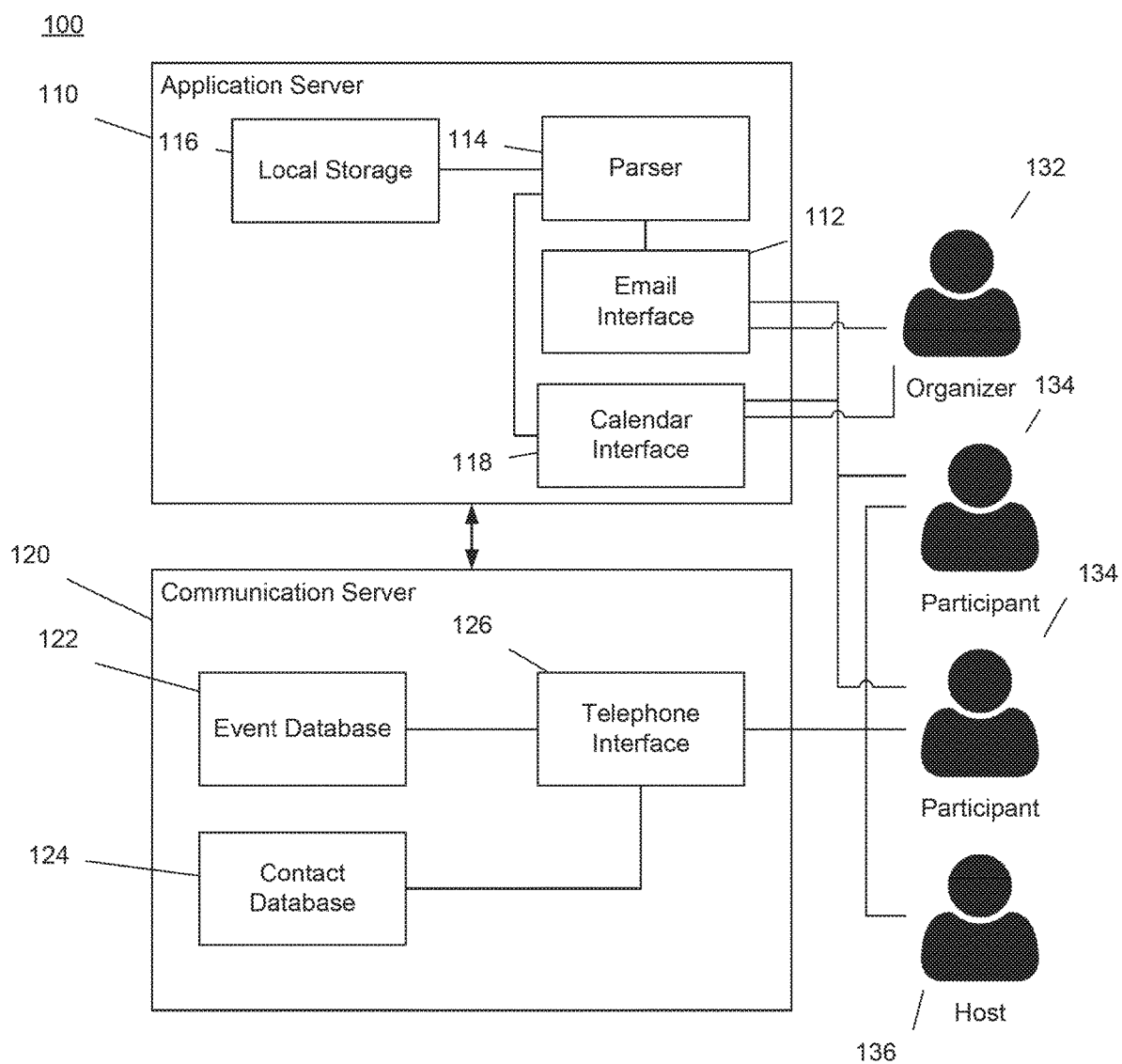
FIG. 1 is a schematic view of a system for scheduling and initiating conference calls according to an embodiment of the invention.

Referring now specifically to FIG. 1, a conference call scheduling and initiating system 100 is presented. The system 100 may comprise an application server 110 and a communication server 120. The application server 110 and the communication server 120 may each comprise computer hardware necessary to enable the storage and processing of digital information and the communication of digital information across a network, including, but not limited to, the Internet. For example, the application server 110 and the communication server 120 may each comprise a processor, a memory operably coupled to the processor, and a network communication device operably coupled to the processor and operable to communicate across a network. Additionally, the application server 110 and the communication server 120 may be configured to communicate with one another across a network, including a local area network (LAN) or a wide area network (WAN), such as the Internet. In some embodiments, the application server 110 and the communication server 120 may be virtual servers run on the same computerized device, i.e. using a single processor, a single memory, and a single network interface device.

The communication server 120 may comprise an event database 122 and a contact database 124. The event database 122 may comprise a plurality of events associated with the system 100. The contact database 124 may comprise a plurality of contact records associated with individuals that may be either event hosts or event participants that facilitate communication therewith. Modes of communication that may be associated with and comprised by contact records may include, but are not limited to, telephone, Internet Protocol (IP) phone, video call, instant messaging, email, and the like.

While each of the event database 122 and the contact database 124 are comprised by the communication server in the present embodiment, it is contemplated and included within the scope of the invention that one or both of the event database 122 and the contact database 124 may be comprised by the application server 110 or another server apart from the application server 110 and the communication server 120.

The application server 110 may comprise an email interface 112. The email interface 112 may be configured to send and receive email communication from individuals external the system 100. The application server 110 may further comprise a parser 114. The parser 114 may be positioned in communication with the email interface 112. The email interface 112 may be operable to receive an email communication from an individual external the system 100, defining received information, and provide either the email communication itself, information comprised by the email communication, or information about the email communication (metadata), in any combination thereof, to the parser 114. The parser 114 may be operable to extract information from information received from the email interface 112. For example, the email interface 112 may receive an email from an event organize 132 and provide that email to the parser 114.

In some embodiments, the parser 114 may be operable to extract from the information received from the email interface 112 information sufficient to initiate scheduling an event, such as a conference call. Such information may include, but is neither limited to nor requires all of, an event date, an event time, an event title, an event host, one or more event participants, and an event location, such as a call-in number. The information extracted by the parser 114 may be stored on local storage 116.

Additionally, in some embodiments, the application server 110 may be operable to receive a calendar event from individuals external the system 100. The calendar event may be received by the application server 110 by any component operable to receive such a digital file, including, but not limited to, a calendar interface 118. The calendar interface 118 may be operable to receive and/or query a third party calendar database to retrieve a calendar event. For example, and not by way of limitation, the calendar interface 118 may be configured to interface with at least one of a Google Calendar application programming interface (API), a CalDAV/iCalendar database, a Microsoft Exchange calendar API, and the like. Once received by the system 100, that calendar interface 118 may provide to the parser 114 the calendar event, information comprised by the calendar event, or information about the calendar event, in any combination thereof. Akin to an email, the parser 114 may be operable to extract event information from the calendar event received from the calendar interface.

The application server 110 may be operable to transmit information extracted by the parser 114 to the communication server 120. Moreover, the application server 110 may be operable to transmit event information about an event extracted by the parser 114 to the event database 122. In some embodiments, the application server 110 may additionally transmit information about the event host and one or more event participants to the event database 122 along with the event information. The event database 122 may be operable to receive event information from the application server 110, generate an event ID associated with the received event information, store the event ID and the received event information as an event record, and transmit the event ID to the application server 110. In some embodiments, the event information extracted by the parser 114 may be for a recurring event. recurring event. The event database 122 is operable to generate a plurality of event records and event IDs for each event associated with the recurring event.

The application server 110 may further be operable to pair the event ID received from the event database 122 with each of an event host and one or more event participants, storing such information on local storage 116. Furthermore, the application server 110 may be operable to transmit the pairing of the event ID with the event host and one or more event participants to the event database 122.

Additionally, the application server 110 may be operable to transmit information regarding at least one of the event host and at least one event participant to the contact database 124. The contact database 124 may be operable to receive the information from the application server regarding at least one of the event host and at least one event participant and search all contacts comprised by the contact database 124 to determine if there is a matching contact within the database. Such a search may be performed utilizing any contact information provided by the application server 110, including, but not limited to, contact name, contact business or organization, telephone number, email address, website Uniform Resource Locator (URL), instant messenger account, and the like. If a matching contact is found within the contact database 124, the contact database 124 may transmit an indication to the application server 110 that the contact exists within the database. If a matching contact is not found within the contact database 124, the contact database 124 may transmit an indication to the application server 110 that the contact is not within the contact database 124.

The application server 110 may be operable to transmit a notification to an event participant 134 responsive to an indication that a contact record was found in the contact database 124 corresponding to the event participant 134. The notification may inform the event participant 134 about the date and time of the conference call and a telephone number to participate in the conference call.

Referring now additionally to FIG. 2, a survey 200 according to an embodiment of the invention is presented. The application server 110 may be operable to send the survey 200 to at least one of an event host and an event participant, defined as a survey recipient, responsive to receiving an indication from the contact database 124 that the contact (i.e. event host or event participant) is not within the contact database 124. The survey 200 may be transmitted to the survey recipient utilizing the information extracted by the parser 114, including, but not limited to, via email. For example, the email interface 112 may be operable to transmit at least one of the survey 200 and a hyperlink to a web page comprising the survey to one or more participants 134.

The survey 200 may be presented in any medium and is specifically contemplated as a web form. The survey 200 may be configured to receive sufficient contact information to enable the survey recipient to participate in the event, e.g. conference call. In some embodiments, the survey 200 may be configured to receive, but is not limited to, a first name, a last name, a telephone number, and an email address. In some embodiments, the email address may be pre-filled with an email address associated with the survey recipient extracted by the parser 114. The survey 200 may comprise fillable fields to receive each of the first name 212, the last name 214, the telephone number 216, and the email address 218, although as mentioned above, the email address field 218 may be pre-filled. Upon entering the information, the survey recipient may transmit the contact information entered into the survey 200 to be returned to the application server 110. In the present embodiment, this may be accomplished by pressing the submit button 220.

The application server 110 may be operable to receive a completed survey and extract contact information therefrom. The application server 110 may further be operable to transmit the extracted contact information to the contact database 124. The contact database 124 may further be operable to receive the extracted contact information from the application server 110 and either create a new contact record comprising the extracted contact information or update an existing contact record with the extracted contact information, either supplementing or replacing any previously existing contact information associated with that contact. Additionally, upon receiving the completed survey, the application server 110 may transmit a notification to the participant 134 regarding the event as described hereinabove.

The application server 110 may further be operable to send an invitation to and receive RSPVs from event participants 134. More specifically, the email interface 112 may be operable to transmit an invitation to the event participants 134 including details about the event, potentially including any of the time, date, duration, location, call-in number, and event password/personal identification number (PIN). The invitation may further be operable to be manipulated by the event participant 134 to indicate whether or not they will participate in the event, such as, for example, including "Yes" and "No" boxes that, when selected, automatically generates an according response to the invitation. In some embodiments, the invitation may be transmitted as an email. The email interface 112 may further be operable to receive an email from the event participants 134 and the event host 136 indicating whether or not they will attend the conference call. Upon receiving a respond from the event host 136 that they will not attend, the application server 110 may be operable to cancel the event, transmitting a request to the event database 122 to remove the event therefrom. Additionally, the application server 110 may be operable to transmit an indication to the event database as to whether each event participant 134 will attend the conference call or not. Where the event participant 134 indicates they will not attend, the application server 110 may be operable to transmit a request to the event database to remove that event participant 134 from the event. Additionally, the application server 110 may be operable to transmit an indication to the event host 136 as to the content of the attendance indication from the event participant 134, i.e. whether they will attend the conference call or not.

In some embodiments, the application server 110 may be operable to receive requests for changes to a scheduled event, process and implement those requests, and disseminate the resulting changes to the event to event participants. For example, the email interface 112 may receive an email from the event organizer 132 requesting a change to the event. Such a requested change may include, but is not limited to, a change in the event date, event time, event host, or event participant. The email interface 112 may be operable to provide either the email containing the request itself, information comprised by the email containing the request, or information about the email containing the request (metadata), in any combination thereof, to the parser 114. The parser 114 may be operable to extract information from information received from the email interface 112 to determine the requested change to the event. The application server 110 may further be operable to transmit extracted requested change information to the event database 122. In turn, the event database 122 may be operable to receive the extracted requested change information from the application server 110 and implement the requested change information to the event record stored on the event database 122.

The communication server 120 may further be operable to initiate a telephone conference. The communication server 120 may comprise a telephone interface 126 operable to create a conference call that conference call participants may call into and to initiate a call to the event participants that, upon establishing communication with the call participant (i.e. the call participant answers the call from the telephone interface 126), places the call participant within the conference call. Devices operable to utilize telephone communication are known in the art and require no additional discussion.

The communication server 120 may be operable to operate the telephone interface 126 responsive to an event comprised by the event database 122. More specifically, the communication server 120 may identify a scheduled event that is approaching and operate the telephone interface 126 to establish a conference call for the time indicated by the scheduled event. Moreover, the communication server 120 may be operable to facilitate the connection of conference call contacts, for example the event host 136 and the event participants 134, through operation of the telephone interface 126. For example, the communication server 120 may operate or otherwise cause the telephone interface to establish a conference call some period before the scheduled start time for the event. In some embodiments, the communication server 120 may establish the conference call five minutes prior to the scheduled time of the event. However, any amount of time prior to the scheduled start time is contemplated and included within the scope of the invention, as well as establishing the conference call immediately at the start time of the event. The telephone interface 126 may be operable to permit the event participants 134 to call into the conference call after the conference call has been initiated by the communication server 120. In some embodiments, the communication server 120 may operate the telephone interface 126 to permit only those contacts that are associated with the event (i.e. are listed as a call host or participant in the event record stored on the event database 122) to call in. In some embodiments, the telephone interface 126 may permit any caller to call in to the conference call. In some embodiments, the communication server 120 may be operable to require entry of at least one of a password or a PIN by a caller before placing the caller into the conference call.

Additionally, the communication server 120 may be operable to operate the telephone interface 126 to initiate a telephone call to the event host 136 and/or the event participants 134. More specifically, either at the start time of the event or some time therebefore or thereafter, the communication server 120 may operate the telephone interface 126 to place a call to the telephone number associated with either the host 136 or the participant 134. When the host 136 or participant 134 answers the call, the telephone interface 126 may place them in the conference call. In this way, the system 100 may maximize the number of participants intended to participate in an event, such as a conference call, by establishing telephonic communication with them at the appropriate time. In some embodiments, the communication server 120 may be operable to require entry of at least one of a password or a PIN by the host 136 or participant 134 prior to placing them in the conference call.

In some embodiments, the communication server 120 may be operable to operate the telephone interface 126 to call the host 136 prior to calling the participants 134. For example, the communication server 120 may be operable to operate the telephone interface 126 to call the host 136 concurrent with or approximately concurrent with creating the conference call. This may reduce the frequency with which participants 134 are either placed into the conference call prior to the host 136 joining the conference call or placed on hold while waiting for the host 136 joining.

Figure 3:
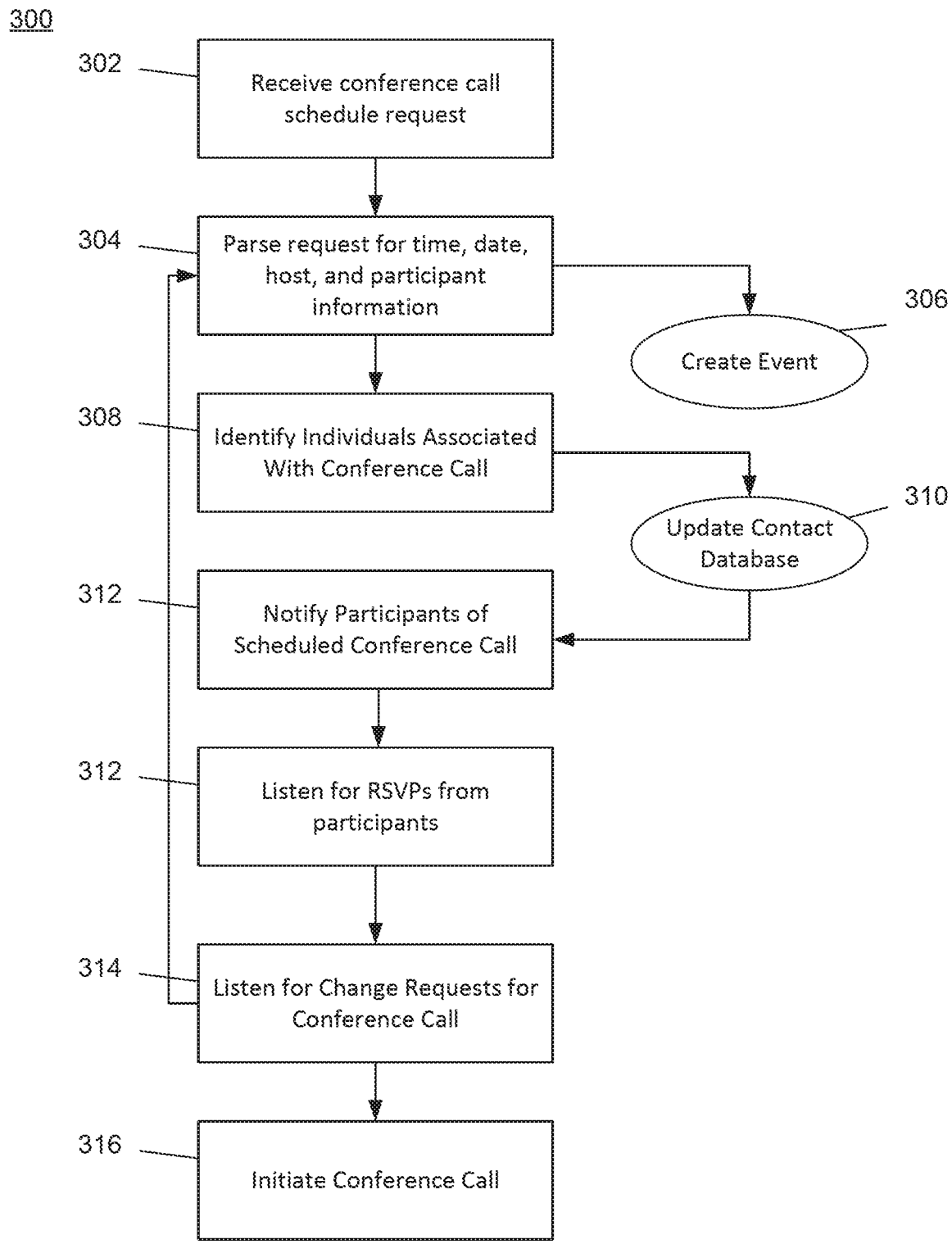
FIG. 3 is a flowchart illustrating a method of scheduling and initiating a conference call according to an embodiment of the invention.
Figure 4:
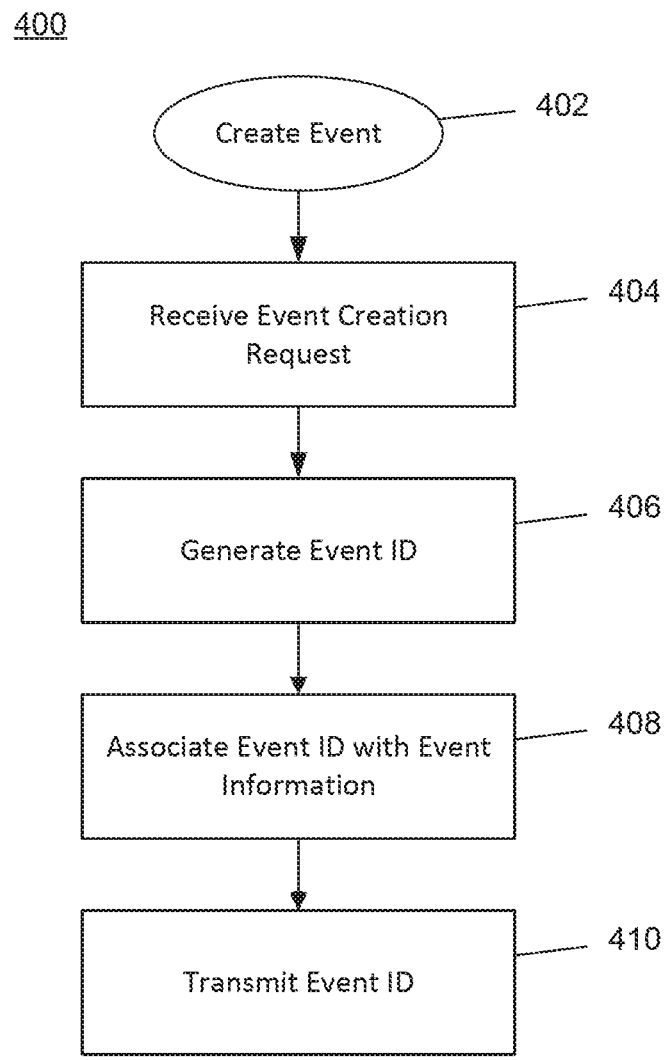
FIG. 4 is a flowchart illustrating a method of creating an event to facilitate scheduling and initiating a conference call according to the embodiment of FIG. 3.
Figure 5:
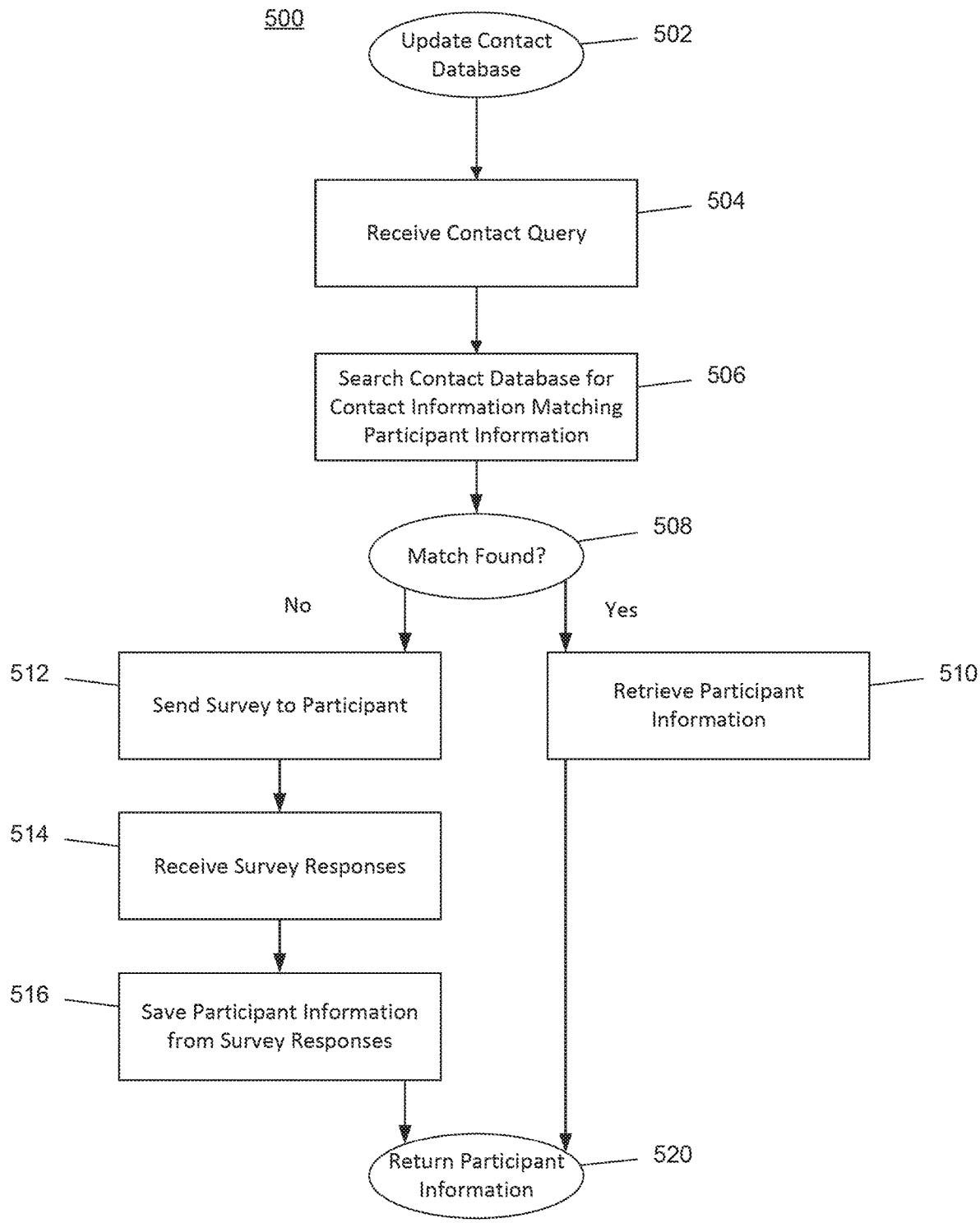
FIG. 5 is a flowchart illustrating a method of updating a contact database to facilitate scheduling and initiating a conference call according to the embodiment of FIG. 3.

Referring now to FIGS. 3-5, various methods of scheduling and initiating a telephone conference will now be discussed. Referring specifically to FIG. 3, a method 300 according to an embodiment of the invention may start at block 302 with the receipt of a conference call scheduling request. Upon receiving the request, the system may parse the request for the date and time of the conference call, the host of the conference call, and the participants in the conference call at block 304. Upon parsing the request, the method 300 may create an event at block 306, as will be described in greater detail hereinbelow.

After block 304, the method 300 may further comprise identifying individuals associated with the conference call at block 308, utilizing the information generated by the parsing performed at block 304. The method 300 may further comprise updating the contact database at block 310. The method 300 may further comprise notifying participants of the scheduled conference call at block 312 and listening for attendance indications from participants at block 314. The method 300 may also comprise listening for change requests for the conference call, e.g. changes to the date, time, call in number, or participants, at block 314. If, at block 314, a change request is received, the method 300 may return to block 304, parsing the change request for changes to the time, date, event host, and event participants, and proceed as described hereinabove. If, at block 314, no change requests are received, the conference call may be initiated at block 316.

Referring now to FIG. 4, a method 400 of creating an event according to an embodiment of the invention is presented. The method 400 may be called at block 306 of method 300 of FIG. 3 and begin at block 402. The method 400 may continue at block 404 where an event creation request is received. Upon receiving an event creation request, an event ID may be generated at block 406. Additionally, at block 408, the Event ID may be associated with event information received as part of the request received at block 404. Additionally, the method 400 may comprise transmitting the Event ID to a recipient, such as the application server 110 of FIG. 1, at block 410.

Referring now to FIG. 5, a method 500 of updating a contact database according to an embodiment of the invention is presented. The method 500 may be called at block 310 of method 300 of FIG. 3 and begin at block 502. Continuing at block 504, a contact query may be received. The contact query may include information about the participant of a conference call, including, but not limited to, an email address. Responsive to the query received at block 504, the method 500 may further comprise searching a contact database at block 506 for a contact record comprising information that matches the participant information received at block 504.

If, at block 508, it is determined that a match was found, the method 500 may continue at block 510 by retrieving additional participant information, including a telephone number, for the contact record that matched at block 508 and returning the additional participant information to where the request originated at block 520.

If, at block 508, a matching contact record is not found, the method 500 may continue at block 512 by sending a survey to the participant associated with the participant information received at block 504. Survey responses may be received at block 514 and participant information contained by the survey responses may be saved into the contact database at block 516. The participant information contained by the survey responses may further be returned to where the request originated at block 520.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A system for scheduling and initiating a telephone conference comprising:
   an application server comprising:

an interface operable to receive information related to a telephone conference, defining received information; and a parser operably coupled to the interface and operable to extract information from the received information, defining event information, comprising an event date, an event time, an event title, an event host, an event participant, and an event location;

the application server being operable to transmit event information;

a communication server operable to receive event information from the application server, defining received event information, and comprising:

an event database operable to:
generate an event ID responsive to the received event information;
store an event record comprising the received event information and the event ID; and
transmit the event ID to the application server;

a contact database comprising a plurality of contact records and operable to:
determine if the plurality of contact records comprises either of the event host or the event participant;
transmit an indication to the application server for each of the event host and the event participant comprised by the plurality of contact records, defining found contacts;
update contact records associated with the found contacts with new or changed information comprised by the event information;
generate a contact record comprising information for the unfound contacts;
record the generated contact record to the contact database; and
transmit an indication to the application server for each of the event host and the event participant not comprised by the plurality of contact records defining unfound contacts; and a telephone interface operable to:
establish a conference call responsive to the event date and the event time;
initiate an outbound call to a first telephone number comprised by the contact record associated with the event host;
initiate an outbound call to a first telephone number comprised by the contact record associated with the event participant; and
place each of the event host or the event participant in the conference call upon the event host or the event participant answering the outbound call;

wherein the application server is further operable to:
transmit an indication about the event record to the found contacts; and
transmit a survey to the unfound contacts.

2. The system according to claim 1 wherein:
the interface of the application server is operable to receive a survey response comprising participant information;
the parser is operable to:
extract the participant information from the survey response; and
transmit the participant information to the communication server; and
the contact database is operable to record the participant information to a contact record of the plurality of contact records associated with a person associated with the participant information.

3. The system according to claim 1 wherein the telephone interface is operable to delay initiating the outbound call to the event participant in the conference call until the event host is placed into the conference call.

4. The system according to claim 1 wherein the found contacts comprises the event participant; and wherein the application server is operable to transmit an indication to the event host that the event participant is comprised by the found contacts.

5. The system according to claim 1 wherein the parser is operable to extract contact information for each of the event host and the event participant; and wherein the survey is transmitted to a contact location comprised by contact information associated with the unfound contacts.

6. The system according to claim 1 wherein the received information comprises a recurring event; and wherein the event database is operable to generate a plurality of event records and event IDs for each event associated with the recurring event.

7. The system according to claim 1 wherein the contact record associated with either of the event host or the event participant comprises a second telephone number; and wherein the telephone interface is further operable to terminate the outbound call to the first telephone number comprised by the contact record associated with the event host or the event participant and initiate an outbound call to the second telephone number comprised by the contact record associated with the event host or the event participant.

8. The system according to claim 1 wherein the application server is further operable to:
receive a participation indication from the event participating as to whether the event participant will participate in the event associated with the event record; and
transmit an indication to the event host responsive to the participation indication.

9. The system according to claim 1 wherein the application server is further operable to receive an event change request; wherein the parser is operable to extract event change request information from the event change request, defining extracted change request information; wherein the application server is operable to transmit the extracted change request information; wherein the event database is operable to implement event changes comprised by the extracted change request information to an event record comprised by the event database.

10. The system according to claim 1 wherein the interface is operable to receive information related to a telephone conference via at least one of an e-mail calendar event and an application programming interface (API).

11. A method of scheduling and initiating a conference call using an application server comprising an interface and a parser and a communication server comprising an event database, a contact database, and a telephone interface, the method comprising:
receiving information related to a telephone conference, defining received information;
parsing the receiving information to extract information from the received information, defining event information, comprising an event date, an event time, an event title, an event host, an event participant, and an event location;
generating an event ID responsive to the received event information;

storing an event record comprising the received event information and the event ID on the event database;
determining if a plurality of contact records comprised by the contact database comprises either of the event host or the event participant;
transmitting an indication to the application server for each of the event host and the event participant comprised by the plurality of contact records, defining found contacts;
updating contact records associated with the found contacts with new or changed information comprised by the event information;
transmitting an indication to the application server for each of the event host and the event participant not comprised by the plurality of contact records defining unfound contacts;
transmitting an indication about the event record to the found contacts;
generating a contact record comprising information for the unfound contacts;
recording the generated contact record to the contact database;
transmitting a survey to the unfound contacts;
establishing a conference call responsive to the event date and the event time;
initiating an outbound call to a first telephone number comprised by the contact record associated with the event host;
initiating an outbound call to a first telephone number comprised by the contact record associated with the event participant; and
placing each of the event host or the event participant in the conference call upon the event host or the event participant answering the outbound call.

12. The method of claim 10 further comprising:
receiving a survey response comprising participant information;
extracting the participant information from the survey response; and
recording the participant information to a contact record of the plurality of contact records associated with a person associated with the participant information.

13. The method of claim 10 further comprising delaying initiating the outbound call to the event participant in the conference call until the event host is placed into the conference call.

14. The method of claim 10 wherein the found contacts comprises the event participant, the method further comprising transmitting an indication to the event host that the event participant is comprised by the found contacts.

15. The method according to claim 10 further comprising extracting contact information for each of the event host and the event participant; wherein the survey is transmitted to a contact location comprised by contact information associated with the unfound contacts.

16. The method according to claim 10 wherein the received information comprises a recurring event, the method further comprising generating a plurality of event records and event IDs for each event associated with the recurring event.

17. The method according to claim 10 wherein the contact record associated with either of the event host or the event participant comprises a second telephone number, the method further comprising:
terminate the outbound call to the first telephone number comprised by the contact record associated with the event host or the event participant; and
initiating an outbound call to the second telephone number comprised by the contact record associated with the event host or the event participant.

18. The method according to claim 10 further comprising:
receiving a participation indication from the event participating as to whether the event participant will participate in the event associated with the event record; and
transmitting an indication to the event host responsive to the participation indication.

19. The method according to claim 10 further comprising:
receiving an event change request;
extracting event change request information from the event change request, defining extracted change request information; and
implementing event changes comprised by the extracted change request information to an event record comprised by the event database.

20. A system for scheduling and initiating a telephone conference comprising:
an application server comprising:
an interface operable to receive information related to a telephone conference, defining received information; and
a parser operably coupled to the interface and operable to extract information from the received information, defining event information, comprising an event date, an event time, an event title, an event host, an event participant, and an event location;
the application server being operable to transmit event information;
a communication server operable to receive event information from the application server, defining received event information, and comprising:
an event database operable to:
generate an event ID responsive to the received event information;
store an event record comprising the received event information and the event ID; and
transmit the event ID to the application server;
a contact database comprising a plurality of contact records and operable to:
determine if the plurality of contact records comprises either of the event host or the event participant;
transmit an indication to the application server for each of the event host and the event participant comprised by the plurality of contact records, defining found contacts;
update contact records associated with the found contacts with new or changed information comprised by the event information;
generate a contact record comprising information for the unfound contacts;
record the generated contact record to the contact database; and
transmit an indication to the application server for each of the event host and the event participant not comprised by the plurality of contact records defining unfound contacts; and
a telephone interface operable to:
establish a conference call responsive to the event date and the event time;
initiate an outbound call to a first telephone number comprised by the contact record associated with the event host;

place the event host in the conference call upon the event host answering the outbound call thereto;

upon placing the event host in the conference call, initiate an outbound call to a first telephone number comprised by the contact record associated with the event participant; and place the event participant in the conference call upon the event participant answering the outbound call thereto;

wherein the application server is further operable to:

transmit an indication about the event record to the found contacts; and transmit a survey to the unfound contacts;

wherein the interface of the application server is operable to receive a survey response comprising participant information;

wherein the parser is operable to:

extract the participant information from the survey response; and transmit the participant information to the communication server; and wherein the contact database is operable to record the participant information to a contact record of the plurality of contact records associated with a person associated with the participant information.

* * * * *